(12) United States Patent
Li et al.

(10) Patent No.: US 11,956,379 B2
(45) Date of Patent: Apr. 9, 2024

(54) RETRACTABLE SCREEN STRUCTURE AND ELECTRONIC DEVICE

(71) Applicant: BEIJING XIAOMI MOBILE SOFTWARE CO., LTD., Beijing (CN)

(72) Inventors: Pengfei Li, Beijing (CN); Zhenhua Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/557,294

(22) Filed: Dec. 21, 2021

(65) Prior Publication Data

US 2022/0417354 A1 Dec. 29, 2022

(30) Foreign Application Priority Data

Jun. 25, 2021 (CN) .......................... 202110713494.8

(51) Int. Cl.
*H04M 1/02* (2006.01)
*G09F 9/30* (2006.01)

(52) U.S. Cl.
CPC .......... *H04M 1/0268* (2013.01); *G09F 9/301* (2013.01)

(58) Field of Classification Search
CPC ............. H04M 1/0268; H04M 1/0237; H04M 1/0235; H04M 2201/38; H04M 1/0231; G06F 1/1652; G06F 1/1624; G06F 1/1643; G09F 9/301
See application file for complete search history.

(56) References Cited

U.S. PATENT DOCUMENTS

| 10,955,876 | B1 | 3/2021 | Song et al. |
| 11,227,516 | B1* | 1/2022 | Shin .......................... G09F 9/30 |
| 2003/0043087 | A1* | 3/2003 | Kim ...................... G06F 1/1641 345/1.1 |
| 2009/0149225 | A1* | 6/2009 | Yokota ..................... H04M 1/03 455/575.3 |
| 2020/0315036 | A1 | 10/2020 | Ahn |
| 2020/0348727 | A1 | 11/2020 | Lee |
| 2021/0386201 | A1* | 12/2021 | Wilson ..................... G06T 7/001 |
| 2022/0035407 | A1* | 2/2022 | Song ....................... G06F 1/1652 |

(Continued)

FOREIGN PATENT DOCUMENTS

| CN | 111911763 A | 11/2020 |
| CN | 112947688 A | 6/2021 |

(Continued)

OTHER PUBLICATIONS

Korean Patent Application No. 10-2021-0183799 Office Action dated Apr. 25, 2023, 7 pages.

(Continued)

*Primary Examiner* — Angelica Perez
(74) *Attorney, Agent, or Firm* — COZEN O'CONNOR

(57) ABSTRACT

A retractable screen structure includes a holder assembly, the holder assembly including a holder and a rotation shaft assembly. The rotation shaft assembly includes a rotation shaft support coupled to a side of the holder and having a shaft hole, a rotation shaft passing through the shaft hole, and a rotation wheel fitted over the rotation shaft. The holder assembly also includes a flexible display screen wound around the rotation wheel. The rotation wheel is driven to rotate when the flexible display screen is expanded or retracted.

19 Claims, 7 Drawing Sheets

(56) References Cited

U.S. PATENT DOCUMENTS

2022/0038564 A1* 2/2022 Li .................... G06F 1/1652
2022/0078934 A1* 3/2022 Lee ................... G06F 1/1652

FOREIGN PATENT DOCUMENTS

| KR | 20170025520 A | 3/2017 |
|----|---|---|
| KR | 102111376 B1 | 5/2020 |
| KR | 20200052371 A | 5/2020 |
| WO | WO 2020211948 A1 | 10/2020 |
| WO | WO 2021107619 A1 * | 11/2020 |

OTHER PUBLICATIONS

Korean Patent Application No. 10-2021-0183799 English Translation of Office Action dated Apr. 25, 2023, 8 pages.
Japanese Patent Application No. 2021-211313, Office Action dated Oct. 25, 2022, 8 pages.
Japanese Patent Application No. 2021-211313, English translation of Office Action dated Oct. 25, 2022, 9 pages.
European Patent Application No. 21218166.3, Search and Opinion dated Jun. 10, 2022, 9 pages.

* cited by examiner

RETRACTABLE SCREEN STRUCTURE AND ELECTRONIC DEVICE

CROSS-REFERENCE TO RELATED APPLICATIONS

This application claims benefit of and priority to Chinese Patent Application Serial No. 202110713494.8, filed on Jun. 25, 2021, the entire contents of which are incorporated herein by reference.

FIELD

The present disclosure relates to the field of retractable screen products and, more particularly, to a retractable screen structure and an electronic device.

BACKGROUND

With the continuous progress of screen technology, mass production of foldable flexible screens has been realized and flexible display screens that measure 0.01 mm in thickness are available globally, thus enriching the form of terminal products from smart wearables to smart home devices to smart phone terminals. Ultra-thin flexible screens allow diverse designs of future products, such as foldable cell phones, ring-shaped cell phones, and special-shaped curved terminal products. Moreover, the arrival of 5G facilitates electrical connection between all intelligent products and accelerates data transmission between products. Further, some modules of intelligent terminal products can still function even if they are separated from the intelligent terminal products, such as camera modules and BOX acoustic modules. Batteries are being developed to achieve higher battery capacity, which also result in terminal products that are smaller in size with more flexible and varied form factors.

With the rise in demand for flexible screen products, display areas need to be increased or decreased to enhance product experience when users deal with different operational tasks, e.g., watching videos and making phone calls. There are currently two main screen expansion structures: foldable screen structures and retractable screen structures.

SUMMARY

Embodiments of the present disclosure provide a retractable screen structure. The retractable screen structure includes: a holder assembly including a holder; a rotation shaft assembly including: a rotation shaft support coupled to a side of the holder and having a shaft hole, a rotation shaft passing through the shaft hole, and a rotation wheel fitted over the rotation shaft; and a flexible display screen wound around the rotation wheel, and driving the rotation wheel to rotate when the flexible display screen is expanded or retracted.

Embodiments of the present disclosure provide an electronic device. The electronic device includes: a housing including a first housing and a second housing arranged on the first housing and being slidable along a first direction, the first housing and the second housing forming a receiving structure having an opening; a retractable screen structure arranged within the receiving structure, in which the retractable screen structure includes: a holder assembly including a holder; a rotation shaft assembly including: a rotation shaft support coupled to a side of the holder and having a shaft hole, a rotation shaft passing through the shaft hole, and a rotation wheel fitted over the rotation shaft; and a flexible display screen wound around the rotation wheel, and driving the rotation wheel to rotate when the flexible display screen is expanded or retracted, and in which an axial direction of the shaft hole is perpendicular to the first direction, the rotation shaft assembly is arranged on a side close to the second housing, and the flexible display screen has a first end close to a bottom of the housing and a second end coupled to the first housing to cover the opening; and a drive assembly arranged within the receiving structure and coupled to the holder, the drive assembly driving the holder to move along the first direction, in which the drive assembly drives the holder to move along the first direction, brings the second housing and the first end of the flexible display screen to move along the first direction relative to the first housing, and allows the flexible display screen to switch between a retracted state and an expanded state.

BRIEF DESCRIPTION OF DRAWINGS

The drawings herein are incorporated into the specification and constitute a part of the specification, show embodiments consistent with the present disclosure, and together with the specification are used to explain the principles of the present disclosure.

DETAILED DESCRIPTION OF EMBODIMENTS

Figure 1:
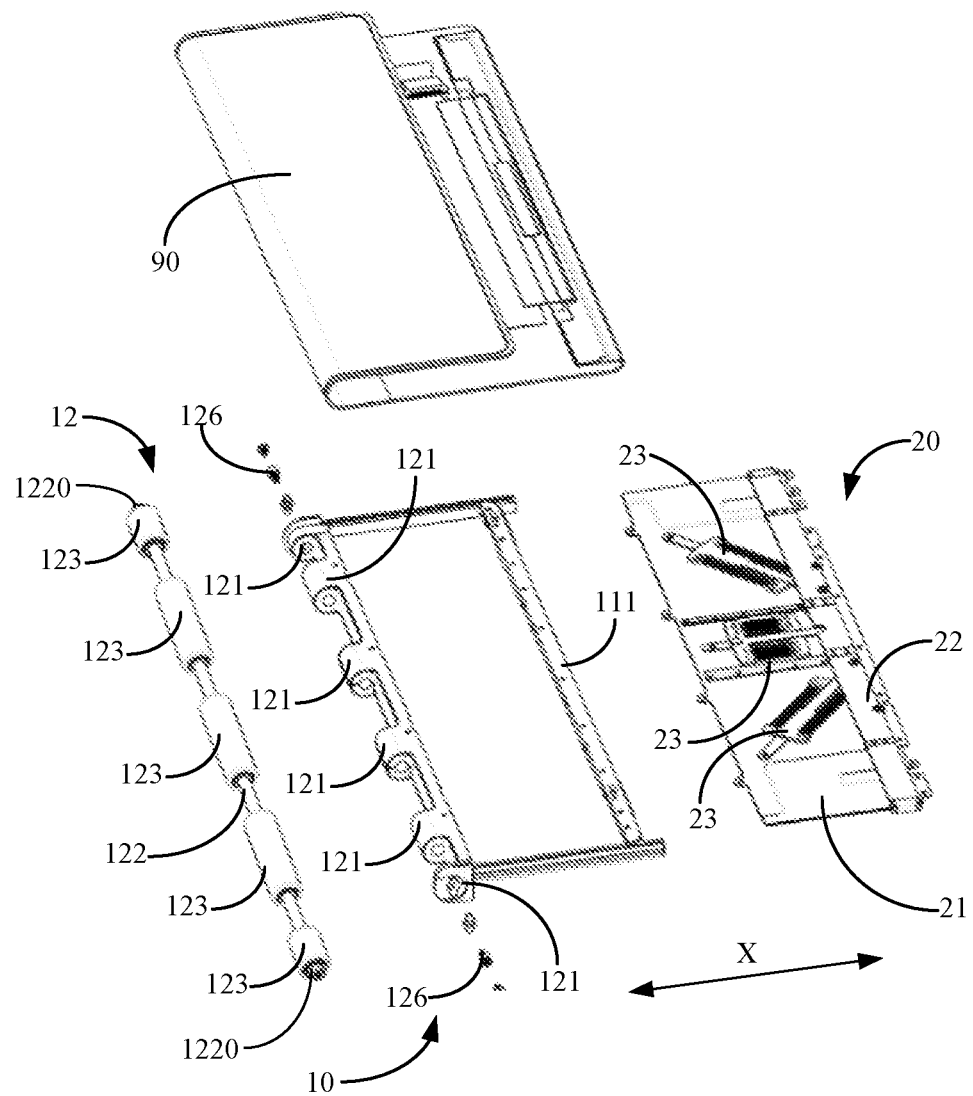
FIG. 1 is an exploded view of a retractable screen structure according to an exemplary embodiment of the present disclosure.

Exemplary embodiments will be described in detail, with examples thereof illustrated in the accompanying drawings.

The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with some aspects of the present disclosure as recited in the appended claims.

Terms used herein in the description of the present disclosure are only for the purpose of describing specific embodiments and are not intended to limit the present disclosure. Unless otherwise defined, technical terms or scientific terms used herein shall be understood in the ordinary sense as appreciated by those of ordinary skill in the art to which the present application belongs. Terms such as "first" and "second" used in the specification and claims are not intended to indicate any sequence, quantity or significance of indicated technical features, and are merely used to distinguish different elements. Likewise, the words "a," "an" and the like used in the specification and claims are not intended to limit the quantity but indicate the presence of at least one element or device referred to by the words. The term "a plurality of" or "several" means two or more than two. Terms such as "front," "rear," "lower" and/or "upper" are merely for the convenience of description and not limited to a position or an orientation, unless indicated otherwise. Terms "comprising" or "containing" mean that the elements or articles before these terms "comprising" or "containing" includes the elements or articles listed after the terms "comprising" or "containing" and do not exclude other elements or articles. The terms "connected" or "coupled" and the like are not limited to physical or mechanical connection, but may include electrical connection, regardless of direct connection or indirect connection.

Terms used in the present disclosure are only used for describing specific embodiments and not intended to limit the present disclosure. As used in the specification and claims, the terms, "a," "the" and "the" in singular forms, are intended to include plural forms, unless clearly indicated in the context otherwise. It should also be understood that, as used herein, the term "and/or" represents and contains any one and all possible combinations of one or more associated listed items.

The present disclosure provides a retractable screen structure and an electronic device. A slide rail mechanism, a retractable screen structure, and an electronic device of the present disclosure will be described in detail below in conjunction with the accompanying drawings, and features in the following embodiments and implementations may be combined with each other in the absence of conflict.

Figure 2:
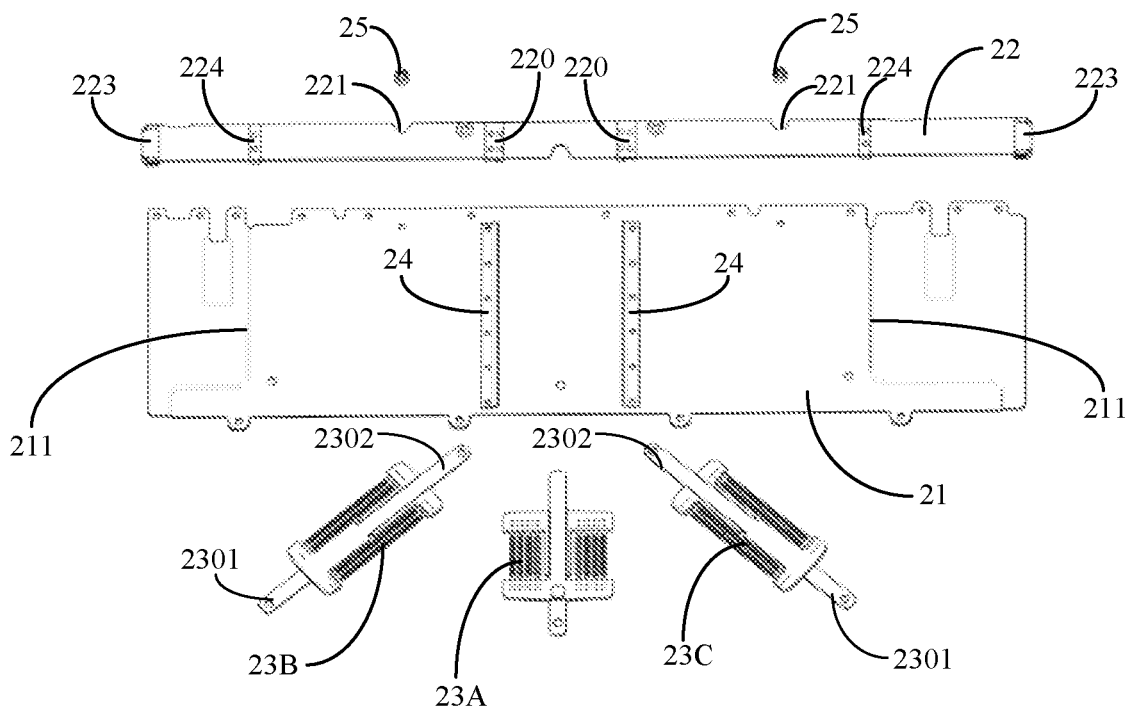
FIG. 2 is an exploded view of a slide rail assembly of a slide rail mechanism according to an exemplary embodiment of the present disclosure.
Figure 3:
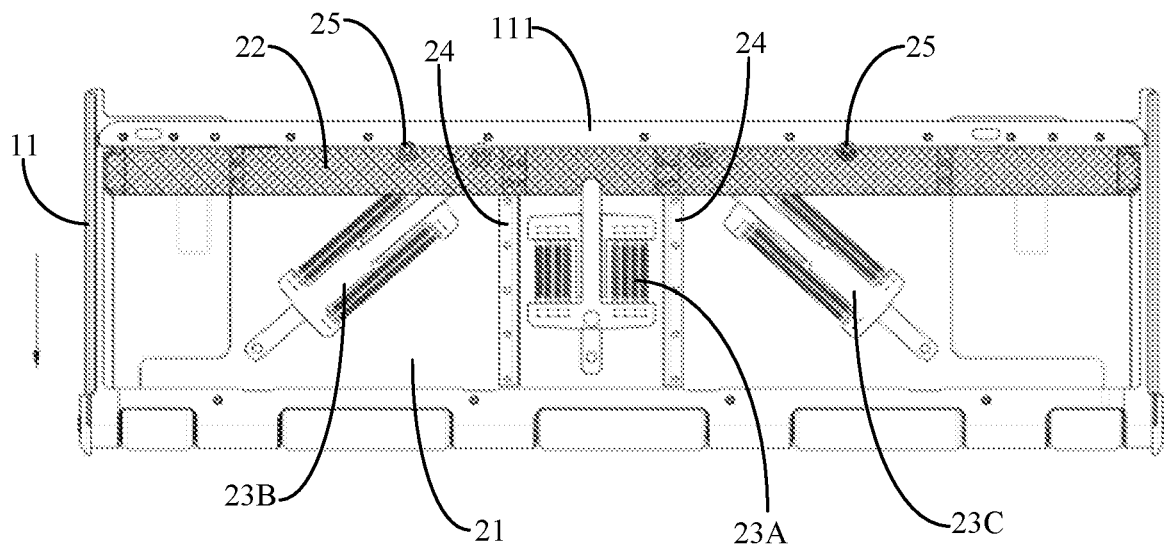
FIG. 3 is a schematic view of a slide rail mechanism according to an exemplary embodiment of the present disclosure.

Referring to FIGS. 1-3, embodiments of the present disclosure provide a retractable screen structure including: a holder assembly 10, a rotation shaft assembly 12, a flexible display screen 90, and a slide rail assembly 20. The holder assembly 10 includes a holder 11. The slide rail assembly 20 includes a fixed seat 21, a sliding member 22 coupled to the flexible display screen 90 of the retractable screen structure, and an elastic assembly 23. The fixed seat 21 is fixedly coupled to the holder 11. The sliding member 22 is arranged on the fixed seat 21 and is slidable along a first direction X (a vertical direction shown in FIG. 3). A first end 2301 of the elastic assembly 23 is coupled to the fixed seat 21, and a second end 2302 of the elastic assembly 23 is coupled to the sliding member 22. When the sliding member 22 slides in the first direction relative to the fixed seat 21, the second end of the elastic assembly 23 and the flexible display screen 90 are driven to move together. The elastic assembly 23 is deformed by being stretched or compressed by the sliding member 22, thereby exerting pre-tension on the flexible display screen 90. It can be appreciated that the sliding member 22 slides downwards relative to the fixed seat 21 in the vertical direction shown in FIG. 3, stretching the elastic assembly 23 and allowing the elastic assembly 23 to generate reversed tension.

Through the above arrangement, with the slide rail mechanism of the present disclosure, the sliding member 22 moves along the first direction X relative to the fixed seat 21 and can drive the flexible display screen 90 of the retractable screen structure to move together, achieving expansion and retraction of the flexible display screen 90. The sliding member 22 drives the elastic assembly 23 to move together, stretching the elastic assembly 23, which can produce pre-tension on the flexible display screen 90, and make the expansion of the flexible display screen 90 more smooth, to avoid causing problems such as screen bulging, swelling and distortion when the whole machine slides open.

In some possible embodiments, the slide rail assembly 20 further includes at least one guide rail 24 arranged on the fixed seat 21 and extending along the first direction X. The sliding member 22 has a slide slot 220 corresponding to the guide rail 24, and the sliding member 22 is slidably arranged in the guide rail 24 by the slide slot 220. In some embodiments, there are four groups of guide rails 24 symmetrically arranged on the fixed seat 21, so that the sliding member 22 slides more firmly. In other examples, the number of guide rails 24 may vary, which will not be limited in the present disclosure.

In some possible embodiments, the slide rail assembly 20 further includes at least one limit block 25 arranged at an end (i.e., an upper end in FIG. 3) of the fixed seat 21 away from the holder 11, and the sliding member 22 includes a limit portion 221 that fits against the limit block 25. The limit block 25 fits against the limit portion 221 of the sliding member 22, which can limit a start position of the sliding member 22 and prevent the sliding member 22 from coming out of the guide rail 24. In some embodiments, the limit portion 221 may be understood as a groove, and there are two limit blocks 25 symmetrically arranged on the fixed seat 21 and two limit portions 221 arranged in correspondence with the limit blocks 25, which will not be limited in the present disclosure. In an example shown in FIG. 3, the limit blocks 25 are arranged at the upper end of the fixed seat 21, and the start position of the sliding member 22 is located at the upper end of the fixed seat 21, in which state the elastic assembly 23 exerts elastic pre-tension on the sliding member 22 to keep the sliding member 22 in the start position.

Figure 4:
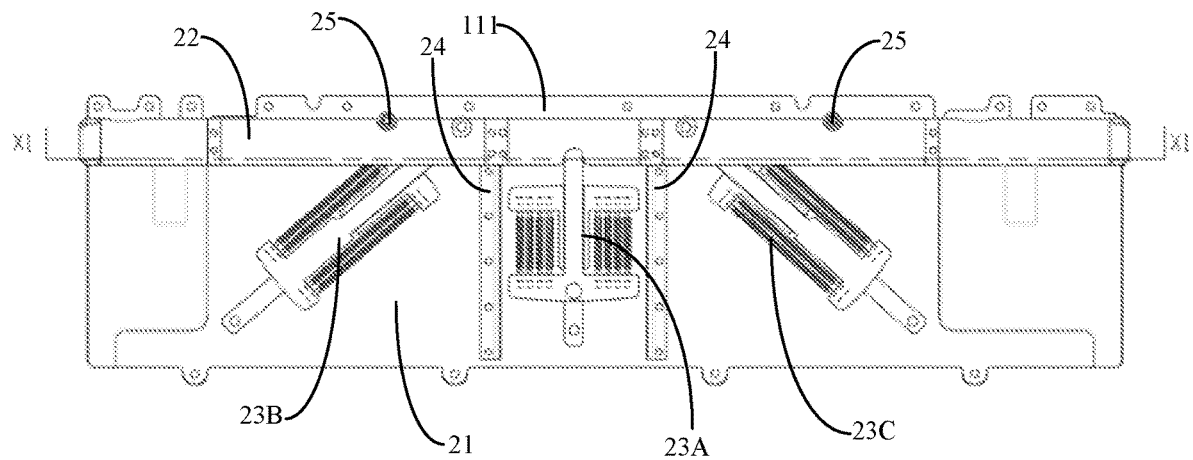
FIG. 4 is a schematic view of a slide rail assembly of a slide rail mechanism according to an exemplary embodiment of the present disclosure.
Figure 5:
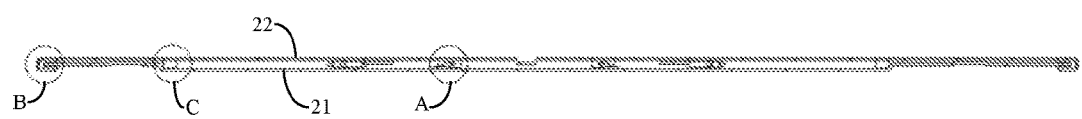
FIG. 5 is a sectional view along X1-X1 direction in FIG. 4.
Figure 6:
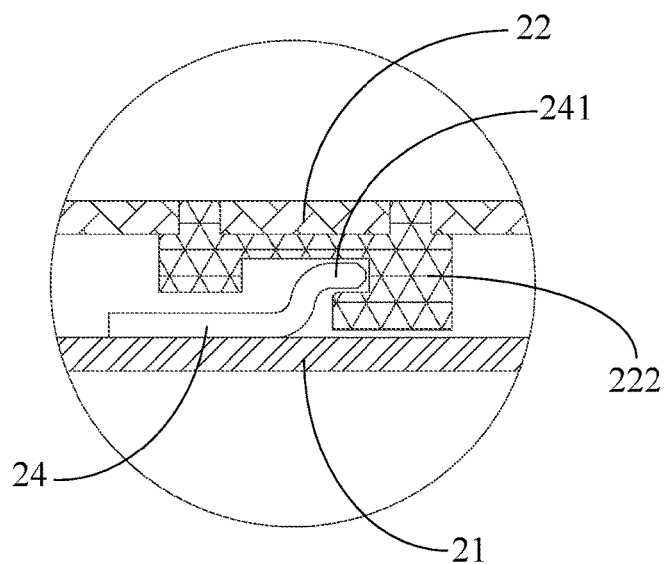
FIG. 6 is a partially enlarged view of part A in FIG. 5.

Referring to FIGS. 4 to 6, in some possible embodiments, the guide rail 24 includes a snap portion 241 on at least one side of the guide rail, and the sliding member 22 includes a first engagement portion 222, the snap portion 241 being snap-fitted to the first engagement portion 222. The sliding member 22 can be coupled to the guide rail 24 more firmly by the snap-fit between the first engagement portion 222 and the snap portion 241 of the guide rail 24, and the sliding member 22 can slide along the guide rail 24 more securely. It can be understood that the snap portion 241 may be an inverted hook structure formed by a sheet metal part to prevent the sliding member 22 from coming out of the guide rail 24. In some embodiments, both sides of the guide rail 24 have the snap portions 241, which will not be limited in the present disclosure.

Figure 7:
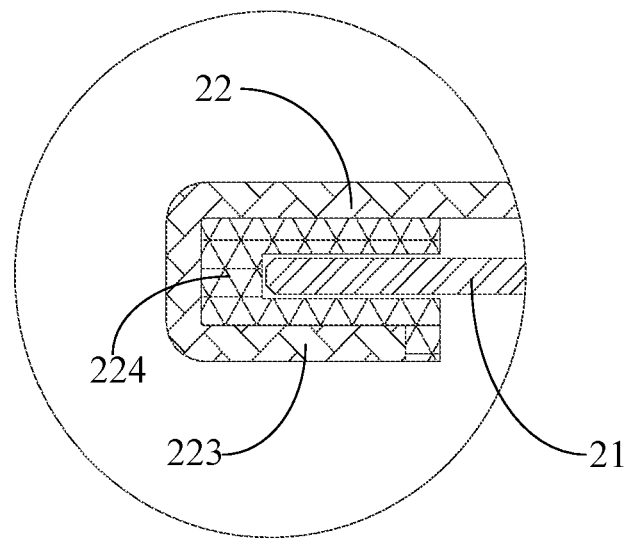
FIG. 7 is a partially enlarged view of part B in FIG. 5.

Referring to FIG. 7, in some possible embodiments, the sliding member 22 includes a second engagement portion 223 on a side of the sliding member, and the second engagement portion 223 is snap-fitted to a side of the fixed seat 21. Through the snap-fit between the second engagement portion 223 and the side of the fixed seat 21, the connection between the sliding member 22 and the fixed seat 21 becomes more stable, preventing the sliding member 22 from coming out of the fixed seat 21 and improving the stability of the sliding member 22 during sliding. Further, the slide rail assembly 20 also includes a plastic engagement portion 224 covering and snapped on the side of the fixed seat 21, and the second engagement portion 223 clamps the plastic engagement portion 224. The plastic engagement portion 224 can reduce friction between the second engagement portion 223 and the side of the fixed seat 21, and reduce wear to ensure smooth sliding. In some embodiments, the plastic engagement portion 224 may employ POM (polyoxymethylene resin) plastic that is a self-lubricating plastic. The sliding member 22 and the plastic engagement portion 224 can be combined together as a single part by a co-molding process (insert-molding), and a gap between the plastic engagement portion 224 and the side of the fixed seat 21 is designed to be 0.05 mm, to ensure that the sliding member 22 can only slide along an extension direction of the guide rail 24, i.e., the first direction X, to improve structural stability.

Figure 8:
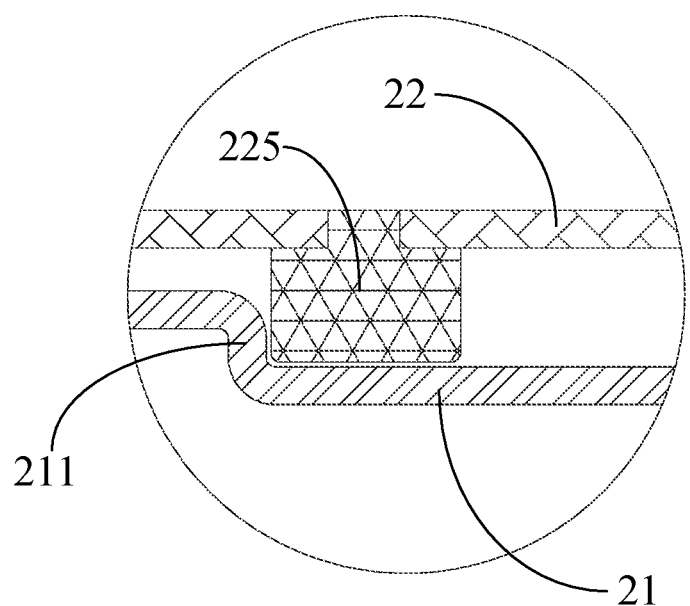
FIG. 8 is a partially enlarged view of part C in FIG. 5.

Referring to FIG. 8, in some possible implementations, the fixed seat 21 includes a step portion 211 extending along the first direction X; and the sliding member 22 includes an abutting block 225 that fits against the step portion 211. Since the abutting block 225 fits with the step portion 211, the sliding member 22 can be further prevented from coming out of the fixed seat 21.

Figure 9:
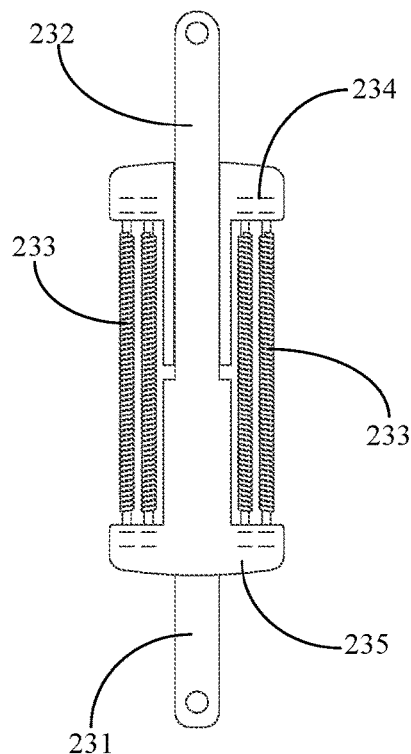
FIG. 9 is a schematic view of an elastic assembly of a slide rail mechanism according to an exemplary embodiment of the present disclosure.

Referring to FIG. 9, in some possible embodiments, the elastic assembly 23 includes a first rod member 231, a second rod member 232, and an elastic member 233. The first rod member 231 and the second rod member 232 are coupled together by insertion and capable of sliding relative to each other. The elastic member 233 is coupled between the first rod member 231 and the second rod member 232. The first rod member 231 is coupled to the fixed seat 21 and the second rod member 232 is coupled to the sliding member 22. The elastic member 233 may be a spring, a tension spring, etc., and exert pre-tension when assembled to keep the sliding member 22 in the start position. When the first rod member 231 and the second rod member 232 are pulled apart, the spring starts to work. When the sliding member 22 slides relative to the fixed seat 21, the second rod member 232 is driven to slide relative to the first rod member 231, and cooperates with the first rod member 231 to stretch or compress the elastic member 233. In such a way, the elastic member 233 deforms and generates an elastic force on the sliding member 22.

Further, each of the first rod member 231 and the second rod member 232 has the slide slot, and the first rod member and the second rod member are coupled together by insertion and are slidable relative to each other. A first end (a lower end in FIG. 9) of the first rod member 231 is fixed to the fixed seat 21 by rivets, and a first end (an upper end in FIG. 9) of the second rod member 232 is fixed to the sliding member 22 by rivets; a second end of the first rod member 231 protrudes outwardly to form a first bump 234, and a second end of the second rod member 232 protrudes outwardly to form a second bump 235. There are a plurality of groups of elastic members 233 evenly distributed between the first bump 234 and the second bump 235, to provide sufficient elastic force. When the sliding member 22 slides relative to the fixed seat 21, the second rod member 232 is driven to slide relative to the first rod member 231, and cooperates with the first rod member 231 to stretch the elastic member 233, so that the elastic member 233 deforms to produce reversed tension on the sliding member 22, ensuring that the flexible display screen is in a "tensioned" state.

In some possible embodiments, there are a plurality of the elastic assemblies 23, including a first elastic assembly 23A, a second elastic assembly 23B, and a third elastic assembly 23C. The second elastic assembly 23B and the third elastic assembly 23C are arranged symmetrically on both sides of the first elastic assembly 23A. An elastic member 233 of the first elastic assembly 23A extends along the first direction X, and elastic members 233 of the second elastic assembly 23B and the third elastic assembly 23C are arranged symmetrically along the first direction X and obliquely relative to the first direction X.

Due to the limited space, a single rail can hardly have such a large elastic stroke. With the above arrangement, three groups of elastic assemblies can form a relay to improve the sliding stroke of the elastic assemblies, among which the second elastic assembly 23B and the third elastic assembly 23C have the same design and are symmetrically arranged on both sides of the first elastic assembly 23A; an initial amount of compression of the elastic member of the first elastic assembly 23A may be slightly larger than an initial amount of compression of the elastic member of the second elastic assembly 23B and an initial amount of compression of the elastic member of the third elastic assembly 23C, to increase the sliding stroke. Assuming that a total sliding stroke is designed to be 30.00 mm, the first elastic assembly 23A can start to work when the sliding member 22 has slid by 19 mm.

In some possible implementations, the slide rail assembly 20 as a whole may be fixed to the holder 11 by riveting. The holder 11 may include a connection plate 111 at one end of the holder, and the fixed seat 21 may be a stamped metal plate fixed to the connection plate 111 by a riveting process. The flexible display screen 90 is fixed to the sliding member 22 of the slide rail assembly 20. The holder 11 may be made of aluminum alloy to improve the structural strength. The sliding member 22 may be made of SUS stainless steel plate and POM plastic by a co-molding process. The stainless steel plate can act as a main body to provide strength support. The slide slot may be formed by POM plastic injection molding and can slide relative to the fixed seat 21 and the guide rail 24 to reduce friction. The limit block 25 may be made of plastic, and can limit the start position of the sliding member 22 and prevent the sliding member 22 from coming out of the guide rail 24. The guide rail 24 may be formed by a stainless steel stamping process and fixed on the fixed seat 21 by spot welding. In cooperation with the slide slot 220 on the sliding member 22, an inverted hook structure is formed to prevent the sliding member 22 from coming out of the guide rail 24 when sliding. An exposed surface of the sliding member 22 may act as an adhesive area 226, to which the flexible display screen 90 affixes.

Figure 10:
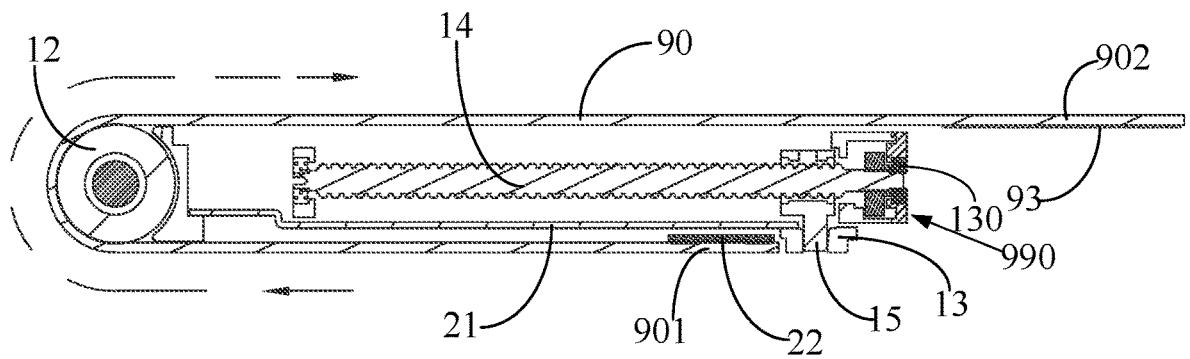
FIG. 10 is a schematic view of a retractable screen structure according to an exemplary embodiment of the present disclosure.

Referring to FIGS. 1 and 10, embodiments of the present disclosure provide a retractable screen structure including the slide rail mechanism and the flexible display screen 90 as described in the above embodiments. The rotation shaft assembly 12 is arranged on a side of the holder 11 away from the slide rail assembly 20, and an axial direction of the rotation shaft assembly 12 is perpendicular to the first direction X. The flexible display screen 90 has a first end 901 coupled to the sliding member 22 and a second end wound 902 around the rotation shaft assembly 12.

The rotation shaft assembly 12 includes a rotation shaft support, a rotation shaft 122 and a rotation wheel. The rotation shaft support is coupled to the side of the holder 11 away from the slide rail assembly 20, and has a shaft hole, a peripheral direction of the shaft hole being perpendicular to the first direction X. The rotation shaft 122 passes through the shaft hole, and the rotation wheel is fitted over the rotation shaft 122. The flexible display screen 90 is wound around the rotation wheel and drives the rotation wheel to rotate when the flexible display screen 90 is expanded or retracted. It can be understood that the first end 901 of the flexible display screen 90 is coupled to the sliding member 22 of the slide rail assembly 20 and the second end 902 of the flexible display screen 90 is wound around the rotation wheel. In some embodiments, the flexible display screen 90 consists of a flexible OLED screen attached to an extremely thin layer of stainless steel mesh, which is highly flexible.

With the above arrangements, the flexible display screen 90 is wound around the rotation wheel of the rotation shaft assembly 12, and when the flexible display screen 90 is expanded or retracted, the rotation wheel is driven to rotate, that is, the rotation wheel passively rotates. The rotation wheel can act as a pulley, to expand or retract the flexible display screen 90 more smoothly, which effectively reduces the friction and energy loss in the process of expanding or retracting the flexible display screen 90 and makes the expansion and retraction of the flexible display screen 90 more smooth.

In some possible embodiments, the rotation shaft 122 is fixedly coupled to the shaft hole and the rotation wheel is rotatably coupled to the rotation shaft 122. It can be understood that the rotation shaft 122 is fixedly coupled to the rotation shaft support, the rotation wheel is rotatable relative to the rotation shaft 122, and the rotation shaft does not rotate relative to the rotation shaft support. When the flexible display screen 90 is expanded or retracted, only the rotation wheel is driven to rotate.

Figure 11:
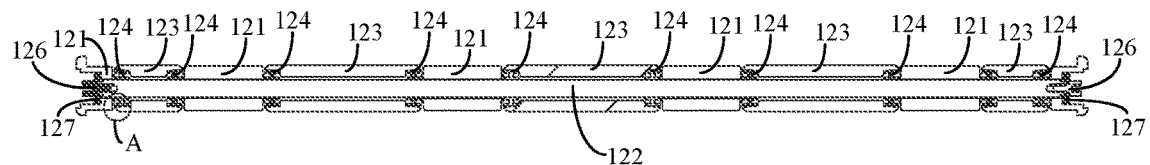
FIG. 11 is a schematic view of a rotation shaft assembly of a retractable screen structure according to an exemplary embodiment of the present disclosure.

Referring to FIGS. 1 and 11, in some possible embodiments, the rotation shaft support includes a plurality of sub-supports 121 spaced apart from each other on the holder 11 in a direction perpendicular to the first direction X. Each of the sub-supports 121 has a shaft sub-hole, respective shaft sub-holes of the plurality of sub-supports 121 are arranged coaxially to form the shaft hole, and the rotation shaft 122 passes through a plurality of shaft sub-holes to be fixedly coupled to the plurality of sub-supports 121. The rotation wheel includes a plurality of rotation sub-wheels 123, and one rotation sub-wheel 123 is arranged between two adjacent sub-supports 121. It can be understood that the rotation shaft support is configured as the plurality of sub-supports 121, the rotation wheel is configured as the plurality of rotation sub-wheels 123, and the sub-supports 121 and the rotation sub-wheels 123 are alternately arranged to enhance the strength of the rotation shaft support and the overall structural strength while ensuring the rotational performance of the rotation wheel. It can be understood that each sub-support 121 of the rotation shaft support is fixedly coupled to the holder 11 or may be integrally formed and processed with the holder 11. It should be noted that the sizes of the sub-supports 121 may be different and, for example, there are small and large sub-supports, small sub-supports being arranged on both sides and large sub-supports being arranged in the middle. The sizes of the rotation sub-wheels 123 may also be different and, for example, there are small and large rotation wheels, which can be set according to actual needs and will not be limited in the present disclosure.

In some possible embodiments, the rotation shaft assembly 12 further includes a plurality of first bearings 124 fitted over the rotation shaft 122, one first bearing 124 being arranged on each side of the rotation sub-wheel 123. Each first bearing 124 includes a bearing inner ring and a bearing outer ring rotatably coupled to the bearing inner ring, the bearing inner ring being coupled to the rotation shaft 122, and the bearing outer ring being coupled to the rotation sub-wheel 123. It can be understood that the rotation sub-wheel 123 rotates relative to the rotation shaft 122 via the first bearing 124, and the first bearing 124 reduces the frictional loss caused by the rotation of the rotation sub-wheel 123; the bearing inner ring and the rotation shaft 122 may be designed in such a way that they fit with each other with no clearance in a radial direction to ensure that the bearing inner ring does not rotate along with the rotation of the rotation sub-wheel 123. The rotation sub-wheel 123 and the rotation shaft 122 may be designed in such a way that they avoid each other in the radial direction to ensure that the rotation sub-wheel 123 and the rotation shaft 122 have a clearance between them to achieve rotation.

Figure 12:
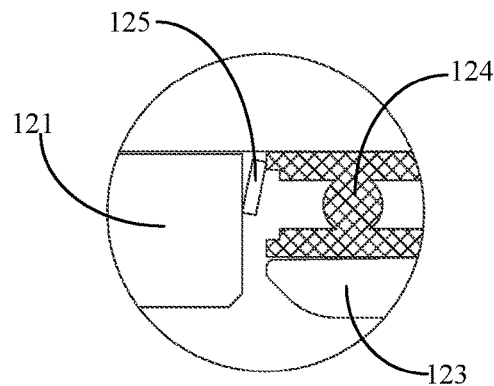
FIG. 12 is a partially enlarged view of part A in FIG. 11.

Referring to FIG. 12, in order to prevent the bearing inner ring from rotating with the rotation sub-wheel 123, i.e., to ensure that the bearing inner ring does not rotate relative to the rotation shaft 122, the rotation shaft assembly 12 further includes a plurality of bearing spacers 125 fitted over the rotation shaft 122, one bearing spacer 125 being arranged on a side of each first bearing 124. Each bearing spacer 125 has a first end abutting against the bearing inner ring and a second end abutting against an adjacent sub-support 121, so that the bearing inner ring and the adjacent sub-support 121 can be tightly pressed against each other to prevent the bearing inner ring from rotating as the rotation sub-wheel 123 rotates and to ensure that the bearing inner ring does not rotate relative to the rotation shaft 122. Thus, the rotation of the rotation sub-wheel 123 is entirely dependent on the rotation of the bearing outer ring, and the friction loss is low.

In some possible embodiments, the bearing spacer 125 is made of copper or stainless steel metals and has a bowl-like cross-section and mechanical properties of being slightly compressible in a thickness direction. A bottom end of the bowl-like structure abuts against the bearing inner ring and an opening end of the bowl-like structure abuts against the adjacent sub-support 121, so that the bearing inner ring and the adjacent sub-support 121 can be tightly pressed against each other.

In some possible embodiments, the rotation shaft assembly 12 further includes two groups of first fasteners 126. The rotation shaft 122 has a first end fixedly coupled to the rotation shaft support by one group of first fasteners 126 and a second end fixedly coupled to the rotation shaft support by the other group of first fasteners 126. It can be understood that the first fasteners 126 pass through outermost sub-supports 121 and are fixedly coupled to both ends of the rotation shaft 122, to secure the rotation shaft 122 to the rotation shaft support. In some embodiments, gaskets 127 are arranged between the first fasteners 126 and the rotation shaft support. The first fasteners 126 may employ child-mother screws, and the gaskets 127 are arranged between the first fasteners 126 and the outermost sub-supports 121, which can make the connection between the rotation shaft 122 and the rotation shaft support firmer. Further, the clearance between the sub-support 121 and the bearing inner ring may be set to zero or only allow slight interference (depending on the material and the size of the parts), so that under locking force of the child-mother screws at both ends, there is pressure between the bearing spacer 125 and the bearing inner ring, and the pressure can ensure that the bearing inner ring does not rotate relative to the rotation shaft 122.

In some embodiments, the rotation sub-wheel 123 may be made of engineering plastic POM by injection molding, with a through hole in the middle and slots on both ends to receive the first bearings 124, and the rotation sub-wheel 123 is fitted over the rotation shaft 122 and can passively rotate around the rotation shaft 122 via the first bearings 124 after being assembled. The rotation shaft 122 may adopt a D-shaped shaft, and the D-shaped cross section mainly serves to fix the bearing inner ring to prevent the bearing inner ring from rotating relative to the rotation shaft. The rotation shaft 122 may be made of stainless steel and passes through the plurality of sub-supports 121. The rotation shaft 122 includes screw threads 1220 on both ends to be fastened and coupled to the first fasteners 126, which also facilitates fixation to a middle frame of the electronic device, thereby fixing the rotation shaft. The first fasteners 126 may be made of metals, such as child-mother screws, and pass through the gaskets 127 to be fastened to the rotation shaft 122 to lock the rotation shaft 122 to the rotation shaft support. The first bearing 124, which may be made of stainless steel or ceramic, is assembled on the rotation sub-wheel 123, and each rotation sub-wheel 123 is assembled with one first bearing 124 and the bearing spacer 125, separately on both ends of the rotation sub-wheel. The bearing spacer 125 may be made of metal. When the rotation sub-wheels are mounted to the rotation shaft, one bearing spacer is arranged on each of both sides of each rotation wheel, and the rotation shaft passes through an inner hole of the bearing spacer. When both ends of the rotation shaft are locked by the child-mother screws, the bearing spacer serves to fix the bearing inner ring and prevent the bearing inner ring from rotating along with the bearing outer ring, and has a function of grounding the first bearing to the holder.

Figure 13:
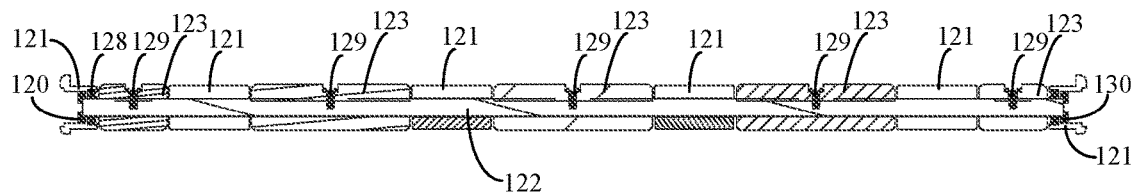
FIG. 13 is a schematic view of a rotation shaft assembly of a retractable screen structure according to another exemplary embodiment of the present disclosure.

Referring to FIG. 1 and FIG. 13, in some possible embodiments, the rotation shaft 122 is rotatably coupled to the shaft hole, and the rotation wheel is fixedly coupled to the rotation shaft 122. It can be understood that the rotation shaft 122 is fixedly coupled to the rotation wheel, the rotation wheel is not rotatable relative to the rotation shaft 122, the rotation shaft 122 is rotatable relative to the rotation shaft support, and the rotation wheel and the rotation shaft 122 are driven to rotate together when the flexible display screen 90 is expanded or retracted.

In some possible embodiments, the rotation shaft support includes a plurality of sub-supports 121 spaced apart from each other on the holder 11 in a direction perpendicular to the first direction X. Each of the sub-supports 121 has a shaft sub-hole, respective shaft sub-holes of the plurality of sub-supports 121 are arranged coaxially to form the shaft hole, and the rotation shaft 122 passes through a plurality of shaft sub-holes to be fixedly coupled to the plurality of sub-supports 121. The rotation wheel includes a plurality of rotation sub-wheels 123, and one rotation sub-wheel 123 is arranged between two adjacent sub-supports 121. It can be understood that the rotation shaft support is configured as the plurality of sub-supports 121, the rotation wheel is configured as the plurality of rotation sub-wheels 123, and the sub-supports 121 and the rotation sub-wheels 123 are alternately arranged to enhance the strength of the rotation shaft support and the overall structural strength while ensuring the rotational performance of the rotation wheel. It can be understood that each sub-support 121 of the rotation shaft support is fixedly coupled to the holder 11 or may be integrally formed and processed with the holder 11. It should be noted that the sizes of the sub-supports 121 may be different and, for example, there are small and large sub-supports, small sub-supports being arranged on both sides and large sub-supports being arranged in the middle. The sizes of the rotation sub-wheels 123 may also be different and, for example, there are small and large rotation wheels, which can be set according to actual needs and will not be limited in the present disclosure.

In some possible embodiments, the rotation shaft assembly 12 further includes two second bearings 128 fitted over both ends of the rotation shaft 122, and the ends of the rotation shaft 122 are rotatably coupled to the rotation shaft support by the second bearings 128. Each second bearing 128 includes a bearing inner ring and a bearing outer ring rotatably coupled to the bearing inner ring, the bearing inner ring being coupled to the rotation shaft support and the bearing outer ring being coupled to the rotation shaft 122. It can be understood that the rotation shaft 122 rotates relative to the sub-support 121 of the rotation shaft support via the second bearing 128, and the second bearing 128 reduces the frictional loss caused by the rotation of the rotation shaft 122. The rotation sub-wheel 123 and the rotation shaft 122 may be designed in such a way that they fit with each other with no clearance in a radial direction to ensure that the rotation sub-wheel 123 will not rotate along with the rotation of the rotation shaft 122. The sub-support 121 of the rotation shaft support and the rotation shaft 122 may be designed in such a way that they avoid each other in the radial direction to ensure that the sub-support 121 and the rotation shaft 122 have a clearance between them to achieve rotation. In some embodiments, only two second bearings 128 are required to achieve rotation of the rotation shaft 122 relative to the rotation shaft support, reducing the number of bearings and simplifying the model design.

In some possible embodiments, the rotation shaft assembly 12 further includes two shaft caps 120, one of the shaft caps 120 abutting against the bearing inner ring of the adjacent second bearing 128 from a first end of the shaft hole, and the other of the shaft caps 120 abutting against the bearing inner ring of the adjacent second bearing 128 from a second end of the shaft hole. The shaft caps 120 are tightly pressed against the bearing inner rings, and the rotation shaft 122 can be axially limited to avoid its displacement in the axial direction.

In some possible embodiments, the rotation shaft assembly 12 further includes a plurality of second fasteners 129, and the second fasteners 129 pass through the rotation sub-wheels 123 and are fixedly coupled to the rotation shaft 122. It can be understood that one rotation sub-wheel 123 may be fixedly coupled to the rotation shaft 122 by one second fastener 129 or may be fixedly coupled to the rotation shaft 122 by a plurality of second fasteners 129, which will not be limited in the present disclosure.

Figure 14:
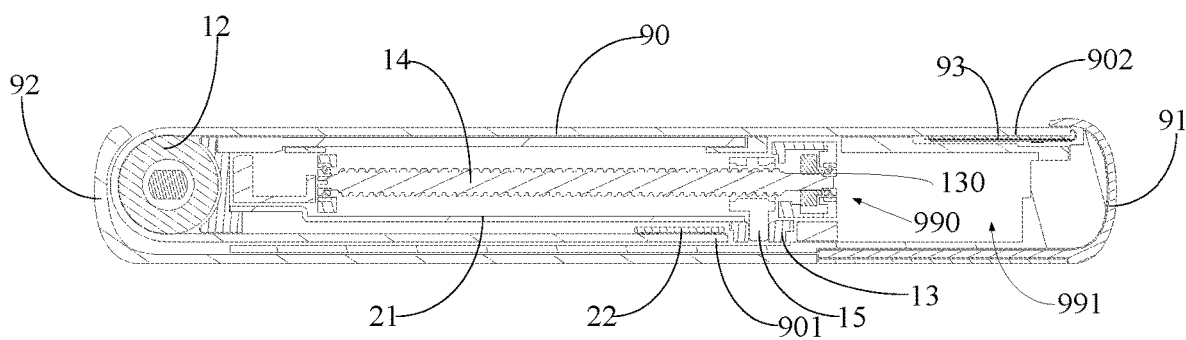
FIGS. 14-15 are schematic views of an electronic device with a flexible display screen in a retracted state and in an expanded state, respectively, according to an exemplary embodiment of the present disclosure.
Figure 15:
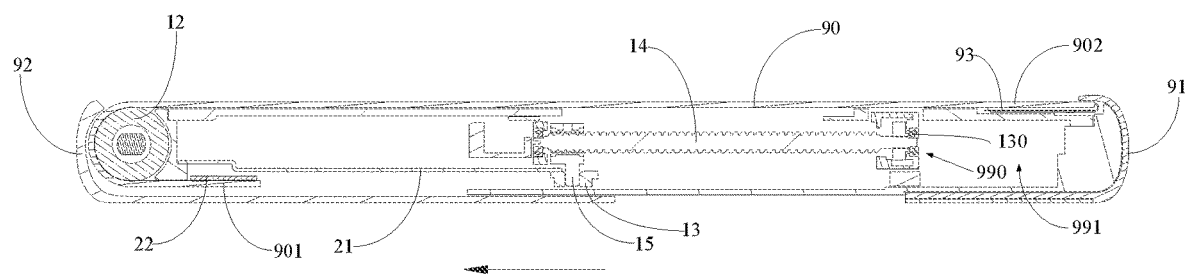
Figure 16:
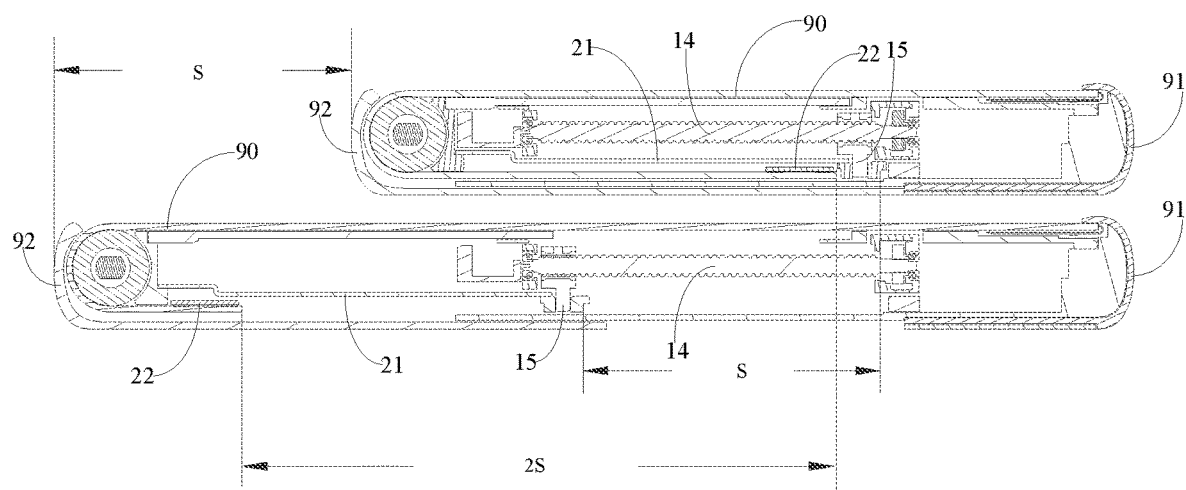
FIG. 16 is a comparison diagram illustrating an electronic device with a flexible display screen in a retracted state and in an expanded state, according to an exemplary embodiment of the present disclosure.

Referring to FIGS. 14 to 16, embodiments of the present disclosure provide an electronic device that may be a cell phone, a mobile terminal, a tablet computer, a laptop computer, a terminal handheld device with a screen, an in-vehicle display device, and the like. The electronic device includes a housing, the retractable screen structure as described in the above embodiments, and a drive assembly 990.

The housing includes a first housing 91 and a second housing 92 slidably arranged on the first housing 91 along the first direction X. The first housing 91 and the second housing 92 form a receiving structure 991 having an opening. The retractable screen structure is arranged within the receiving structure 991; the rotation shaft assembly 12 is arranged on a side close to the second housing 92; the first end 901 of the flexible display screen 90 is close to a bottom of the housing and the second end 902 of the flexible display screen 90 is coupled to the first housing 91 to cover the opening. The drive assembly 990 is arranged within the receiving structure 991, and the drive assembly 990 is coupled to the slide rail mechanism to drive the slide rail mechanism to move in the first direction X. In some embodiments, the first housing 91 may include a support plate 93, and the second end of the flexible display screen 90 is coupled to the support plate 93, which may provide support and protection for the flexible display screen 90.

The drive assembly 990 drives the slide rail mechanism to move along the first direction X, bringing the second housing 92, the slide rail assembly 20, the first end of the flexible display screen 90 and the sliding member 22 to move along the first direction X relative to the first housing 91, and allowing the flexible display screen 90 to switch between a retracted state and an expanded state.

As shown in FIG. 14, the sliding member 22 in the start position is subjected to a preload force of the elastic assembly due to the preload of the elastic member of the elastic assembly and remains stationary in the start position due to the presence of the limit block 25, in which case the flexible display screen 90 is in the retracted state.

The drive assembly 990 as a power source is fixed to the middle frame (also known as the housing) of the whole machine, and the electronic device receives a command through UI and controls the drive assembly 990 to drive the slide rail mechanism to move in the first direction X (i.e., moving leftwards in FIG. 15), so that the slide rail mechanism as a whole slides out relative to the first housing 91 in a direction away from the first housing 91. During this process, the first end of the flexible display screen 90 slides together with the sliding member 22, and the rotation wheel of the rotation shaft assembly passively rotates under the force of the flexible display screen 90. Since the second end of the flexible display screen 90 is coupled to the first housing 91, an effect of expanding the flexible display screen 90 gradually can be achieved as the slide rail mechanism gradually slides out, as shown in FIG. 15. During the sliding process of the slide rail mechanism, the sliding member 22 can move from one end of the fixed seat 21 to the other end of the fixed seat under the pull of the flexible display screen, which can further increase an expanding length of the flexible display screen 90. Moreover, during the sliding process, the elastic assembly is stretched by the sliding member 22 and exerts, on the sliding member 22, elastic tension with a reverse direction opposite to a sliding direction, the flexible display screen 90 is always subject to the tension in the reverse direction, which is equivalent to pulling the flexible display screen 90 rightwards. As a result, the flexible display screen 90 expanded is flatter, and a trajectory of bending the flexible display screen 90 conforms to the design intention, to avoid causing problems such as screen bulging, swelling and distortion when the whole machine slides open.

It can be understood that throughout the process, the sliding member 22 is pulled by the second end of the flexible display screen 90 and can move from one end of the fixed seat 21 to the other end thereof. Assuming that the slide rail mechanism slides out for a stroke of S relative to the first housing 91 and the sliding member 22 slides for a stroke of S, the first end of the flexible display screen 90 moves for a distance of 2S along with the slide rail mechanism relative to the first housing 91.

When the whole machine receives an external command for retraction, a drive motor 130 starts to drive reversely, retracting the slide rail mechanism and the flexible display screen. In this process, the holder and the fixed seat are driven by the drive assembly 990 to move in the reverse direction, the flexible display screen and the sliding member are gradually retracted under the elastic force of the elastic assembly, and the sliding member returns to the start position under the elastic force of the elastic assembly, thus restoring the flexible display screen to the retracted state. Therefore, the use of the slide rail mechanism of the present disclosure can smoothly and effectively ensure that the flexible display screen keeps a bending form throughout the sliding opening and retracting process, and that the power loss caused by the friction generated in the process of sliding opening and retracting the screen is at a low level, and realize practical and easily attainable solutions to guarantee product reliability.

Referring to FIGS. 14 and 15, in some possible embodiments, the holder 11 includes a transmission member 13. The drive assembly 990 includes the drive motor 130, a screw rod 14 coupled to the drive motor 130, and a nut 15 fitted over the screw rod 14. The screw rod 14 extends along the first direction X, and the nut 15 abuts against the transmission member 13. The drive motor 130 drives the screw rod 14 to rotate, bringing the nut 15 and the transmission member 13 to move along the first direction X, and bringing the slide rail mechanism to move along the first direction X. It should be noted that the drive assembly 990 may also adopt a rack-and-pinion structure, a worm-and-gear structure and the like.

Other embodiments of the present disclosure may be conceivable for those skilled in the art after considering the specification and practicing the technical solutions disclosed herein. The present disclosure is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and the embodiments are regarded as exemplary only, and the true scope of the present disclosure are indicated by the following claims.

It should be understood that the present disclosure is not limited to the particular structures described above and shown in the drawings, and various modifications and changes can be made without departing from the scope of the present disclosure. The scope of the present disclosure is only limited by the appended claims.

What is claimed is:
1. A retractable screen structure, comprising:
a holder assembly comprising a holder;
a rotation shaft assembly comprising:
  a rotation shaft support coupled to a side of the holder and having a shaft hole,
  a rotation shaft passing through the shaft hole,
  a rotation wheel fitted over the rotation shaft; and
a flexible display screen wound around the rotation wheel, and driving the rotation wheel to rotate when the flexible display screen is expanded or retracted,
wherein:
the rotation shaft support comprises a plurality of sub-supports spaced apart from each other on the holder;
the rotation shaft assembly further comprises a plurality of first bearings fitted over the rotation shaft, and each first bearing comprises a bearing inner ring and a bearing outer ring rotatably coupled to the bearing inner ring;

the rotation shaft assembly further comprises a plurality of bearing spacers fitted over the rotation shaft, one bearing spacer being arranged on a side of each first bearing; and each bearing spacer has a first end abutting against the bearing inner ring and a second end abutting against an adjacent sub-support.

2. The retractable screen structure according to claim 1, wherein the rotation shaft is fixedly coupled to the shaft hole, and the rotation wheel is rotatably coupled to the rotation shaft.

3. The retractable screen structure according to claim 2, wherein:
each of the sub-supports has a shaft sub-hole, respective shaft sub-holes of the plurality of sub-supports are arranged coaxially to form the shaft hole, and the rotation shaft passes through a plurality of shaft sub-holes;
the rotation wheel comprises a plurality of rotation sub-wheels, and one rotation sub-wheel is arranged between two adjacent sub-supports.

4. The retractable screen structure according to claim 3, wherein:
one first bearing is arranged on each of both sides of the rotation sub-wheel;
the bearing inner ring is coupled to the rotation shaft, and the bearing outer ring is coupled to the rotation sub-wheel.

5. The retractable screen structure according to claim 4, wherein the bearing inner ring of the first bearing fits with the rotation shaft with no clearance in a radial direction.

6. The retractable screen structure according to claim 3, wherein:
the plurality of sub-supports comprise small sub-supports and large sub-supports, the small sub-supports being on both sides and the large sub-supports being in the middle;
the plurality of rotation sub-wheels comprise small rotation sub-wheels and large rotation sub-wheels.

7. The retractable screen structure according to claim 4, wherein the rotation sub-wheel and the rotation shaft avoid each other in a radial direction and have a clearance between them.

8. The retractable screen structure according to claim 1, wherein:
the bearing spacer exhibits a bowl-like structure, and
the bowl-like structure has a bottom end abutting against the bearing inner ring and an opening end abutting against the adjacent sub-support.

9. The retractable screen structure according to claim 1, wherein:
the rotation shaft assembly further comprises two groups of first fasteners;
the rotation shaft has a first end fixedly coupled to the rotation shaft support by one group of first fasteners and a second end fixedly coupled to the rotation shaft support by the other group of first fasteners.

10. The retractable screen structure according to claim 9, wherein gaskets are arranged between the first fasteners and the rotation shaft support.

11. The retractable screen structure according to claim 1, wherein the rotation shaft is rotatably coupled to the shaft hole, and the rotation wheel is fixedly coupled to the rotation shaft.

12. The retractable screen structure according to claim 11, wherein:
each of the sub-supports has a shaft sub-hole, respective shaft sub-holes of the plurality of sub-supports are arranged coaxially to form the shaft hole, and the rotation shaft passes through a plurality of shaft sub-holes;
the rotation wheel comprises a plurality of rotation sub-wheels, and one rotation sub-wheel is arranged between two adjacent sub-supports.

13. The retractable screen structure according to claim 12, wherein:
the rotation shaft assembly further comprises two second bearings fitted over both ends of the rotation shaft, and the ends of the rotation shaft are rotatably coupled to the rotation shaft support by the second bearings;
each second bearing comprises a bearing inner ring and a bearing outer ring rotatably coupled to the bearing inner ring, the bearing inner ring being coupled to the rotation shaft support and the bearing outer ring being coupled to the rotation shaft.

14. The retractable screen structure according to claim 13, wherein:
the rotation shaft assembly further comprises two shaft caps; and
one of the shaft caps abuts against an adjacent inner ring of the rotation shaft from a first end of the shaft hole, and the other of the shaft caps abuts against an adjacent inner ring of the rotation shaft from a second end of the shaft hole.

15. The retractable screen structure according to claim 12, wherein the rotation shaft assembly further comprises a plurality of second fasteners, and the plurality of second fasteners pass through the rotation sub-wheels and are fixedly coupled to the rotation shaft.

16. An electronic device, comprising:
a housing comprising a first housing and a second housing arranged on the first housing and being slidable along a first direction, the first housing and the second housing forming a receiving structure having an opening;
a retractable screen structure arranged within the receiving structure,
wherein:
the retractable screen structure comprises:
a holder assembly comprising a holder;
a rotation shaft assembly comprising:
a rotation shaft support coupled to a side of the holder and having a shaft hole,
a rotation shaft passing through the shaft hole,
a rotation wheel fitted over the rotation shaft; and
a flexible display screen wound around the rotation wheel, and driving the rotation wheel to rotate when the flexible display screen is expanded or retracted,
an axial direction of the shaft hole is perpendicular to the first direction, the rotation shaft assembly is arranged on a side close to the second housing, and the flexible display screen has a first end close to a bottom of the housing and a second end coupled to the first housing to cover the opening; and
a drive assembly arranged within the receiving structure and coupled to the holder, the drive assembly driving the holder to move along the first direction, wherein the drive assembly drives the holder to move along the first direction, brings the second housing and the first end of the flexible display screen to move along the first direction relative to the first housing, and allows the flexible display screen to switch between a retracted state and an expanded state, wherein:

the rotation shaft support comprises a plurality of sub-supports spaced apart from each other on the holder, each of the sub-supports has a shaft sub-hole, respective shaft sub-holes of the plurality of sub-supports are arranged coaxially to form the shaft hole, and the rotation shaft passes through a plurality of shaft sub-holes;

the rotation shaft assembly further comprises a plurality of first bearings fitted over the rotation shaft, and each first bearing comprises a bearing inner ring and a bearing outer ring rotatably coupled to the bearing inner ring;

the rotation shaft assembly further comprises a plurality of bearing spacers fitted over the rotation shaft, one bearing spacer being arranged on a side of each first bearing; and each bearing spacer has a first end abutting against the bearing inner ring and a second end abutting against an adjacent sub-support.

17. The electronic device according to claim 16, wherein:

the drive assembly comprises a drive motor, a screw rod coupled to the drive motor, and a nut fitted over the screw rod, the screw rod extending along the first direction and the nut abutting against the holder;

the drive motor drives the screw rod to rotate and brings the nut and the holder to move along the first direction.

18. The electronic device according to claim 16, further comprising: a slide rail assembly arranged on the holder and being slidable along a direction perpendicular to the axial direction of the shaft hole, the slide rail assembly being coupled to the first end of the flexible display screen, wherein the slide rail assembly is driven to slide along the first direction relative to the holder when the flexible display screen moves along the first direction.

19. The electronic device according to claim 16, wherein the first housing comprises a support plate, and the second end of the flexible display screen is coupled to the support plate.

* * * * *